(12) United States Patent
Shibayama (10) Patent No.: US 6,987,623 B2
(45) Date of Patent: Jan. 17, 2006

(54) IMAGE SIZE CHANGEABLE FISHEYE LENS SYSTEM

(75) Inventor: Atsushi Shibayama, Tokyo (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 10/769,873

(22) Filed: Feb. 3, 2004

(65) Prior Publication Data

US 2004/0156119 A1 Aug. 12, 2004

(30) Foreign Application Priority Data

Feb. 4, 2003 (JP) .............................. 2003-026977

(51) Int. Cl.
*G02B 15/14* (2006.01)
(52) U.S. Cl. ..................... 359/691; 359/725
(58) Field of Classification Search ........ 359/676–692, 359/725, 662
See application file for complete search history.

(56) References Cited

U.S. PATENT DOCUMENTS 3,734,600 A    5/1973  Shimizu .................... 359/723
4,429,957 A *  2/1984  King ........................ 359/676
5,724,193 A *  3/1998  Hirakawa ................... 359/691
5,877,901 A *  3/1999  Enomoto et al. ............ 359/691
2001/0013973 A1* 8/2001  Bos ......................... 359/565

FOREIGN PATENT DOCUMENTS

JP          49-20534        5/1974

* cited by examiner

*Primary Examiner*—Scott J. Sugarman
*Assistant Examiner*—M. Hasan
(74) *Attorney, Agent, or Firm*—Miles & Stockbridge PC (57) ABSTRACT

The invention provides a fisheye lens system having an angle of view of 170 degrees or more capable of being used with a plurality of cameras having different image formats in size. The lens system includes a first lens group G1 having negative refractive power disposed to the most object side and a second lens group G2 having positive refractive power disposed to an image side of the first lens group. A distance between the first lens group G1 and the second lens group G2 is variable. The lens system takes the maximum focal length state when the distance is minimum and the minimum focal length state when the distance is maximum. The maximum image height in the maximum focal length state is different from that in the minimum focal length state. In each focal length state, the fisheye lens system has an angle of view of 170 degrees or more.

10 Claims, 12 Drawing Sheets

IMAGE SIZE CHANGEABLE FISHEYE LENS SYSTEM

The disclosure of the following priority application is herein incorporated by reference:

Japanese Patent Application No. 2003-026977 filed Feb. 4, 2003.

BACKGROUND OF THE INVENTION

1. Field of the Invention

The present invention relates to a fisheye lens system for an SLR camera and, in particular, to a fisheye lens system having an angle of view of 170 degrees or more.

2. Related Background Art

A fisheye lens having an angle of view of 170 degrees or more has been proposed, for example, in Japanese Patent Publication No. 49-20534. In a recent interchangeable lens SLR camera system, an interchangeable lens is used not only for an SLR camera having a 35 mm film format (image size: 36×24 mm, diagonal length: 43.2 mm), but also for an SLR camera having an APS film format (image size: 30.2×16.7 mm, diagonal length: 34.4 mm). Moreover, the same interchangeable lens is used for a digital SLR camera having a solid state imaging device such as a CCD (for example, image size: 23.7×15.6 mm, diagonal length: 28.4 mm).

When the same interchangeable lens is attached to the above-described three kinds of SLR cameras (35 mm film format, APS film format, digital SLR), there has been a problem that the angle of view of the images are different with each other. The problem becomes serious when a fisheye lens requiring an angle of view of 170 degrees or more is used. When a fisheye lens for a 35 mm film format SLR camera is attached to a digital SLR camera, the angle of view becomes severely narrow, so that a special effect of a fisheye lens becomes difficult to be obtained.

SUMMARY OF THE INVENTION

The present invention is made in view of the aforementioned problems and has an object to provide a fisheye lens system having an angle of view of 170 degrees or more capable of being used with a plurality of cameras having different image formats in size.

According to one aspect of the present invention, a fisheye lens system includes a first lens group having negative refractive power disposed to the most object side and a second lens group having positive refractive power disposed to an image side of the first lens group. A distance between the first lens group and the second lens group is variable. The fisheye lens system takes the maximum focal length state when the distance is minimum and the minimum focal length state when the distance is maximum. The maximum image height in the maximum focal length state is different from that in the minimum focal length state. In each focal length state, the fisheye lens system has an angle of view of 170 degrees or more.

In one preferred embodiment of the present invention, the lens system may be used for a plurality of cameras whose image sizes are different with each other. When the lens system is attached to a camera having the maximum image size in the maximum focal length state, the lens system has an angle of view of 170 degrees or more. When the lens system is attached to a camera having the minimum image size in the minimum focal length state, the lens system has an angle of view of 170 degrees or more.

In one preferred embodiment of the present invention, the lens system may be used by changing over two states that are the maximum focal length state and the minimum focal length state. Upon changing over each state, the first lens group is not moved, and the second lens group is moved.

In one preferred embodiment of the present invention, the lens system may be used in any focal length state between the maximum focal length state and the minimum focal length state. Upon changing the focal length state, both the first lens group and the second lens group are moved.

In one preferred embodiment of the present invention, upon focusing from a far object to a close object, the first lens group is moved to the object.

In one preferred embodiment of the present invention, the lens system further includes an aperture stop. A distance between the most object side lens surface and the aperture stop is the same in the maximum focal length state and in the minimum focal length state.

In one preferred embodiment of the present invention, upon focusing from a far object to a close object, the first lens group and the aperture stop are moved in a body to the object side.

In one preferred embodiment of the present invention, the lens system includes, in order from the object, the first lens group, the aperture stop, and the second lens group. Upon changing the focal length state from the maximum focal length state to the minimum focal length state, a distance between the first lens group and the aperture stop is fixed, a distance between the aperture stop and the second lens group increases, and a distance between the second lens group and an image plane decreases. Upon focusing from a far object to a close object, the distance between the first lens group and the aperture stop is fixed, the distance between the aperture stop and the second lens group increases, and the distance between the second lens group and an image plane is fixed. The following conditional expression (1) is preferably satisfied:

$$1.2 < M2L/M2S \tag{1}$$

where M2L denotes the magnification of the second lens group in the maximum focal length state, and M2S denotes the magnification of the second lens group in the minimum focal length state.

In one preferred embodiment of the present invention, the lens system includes, in order from the object, the first lens group, the aperture stop, and the second lens group. Upon changing the focal length state from the maximum focal length state to the minimum focal length state, a distance between the first lens group and the aperture stop is fixed, a distance between the aperture stop and the second lens group increases, and a distance between the second lens group and an image plane decreases. The following conditional expressions (1) through (3) are preferably satisfied:

$$1.2 < M2L/M2S \tag{1}$$

$$0.97 < M2L \cdot M2S < 1.03 \tag{2}$$

$$fS < |f1| < fL \tag{3}$$

where M2L denotes the magnification of the second lens group in the maximum focal length state, M2S denotes the magnification of the second lens group in the minimum focal length state, fL denotes the focal length of the fisheye lens system in the maximum focal length state, fS denotes the focal length of the fisheye lens system in the minimum focal length state, and f1 (f1<0) denotes the focal length of the first lens group G1.

In one preferred embodiment of the present invention, the lens system includes, in order from the object, the first lens group and the second lens group. Upon changing the focal length state from the maximum focal length state to the minimum focal length state, a distance between the first lens group and the second lens group increases, and a distance between the second lens group and an image plane decreases. The first lens group includes a negative meniscus lens having a convex surface facing to the object disposed to the most object side, and the second lens group includes a positive lens having an aspherical surface.

Other feature and advantages according to the present invention will be readily understood from the detailed description of the preferred embodiments in conjunction with the accompanying drawings.

BRIEF DESCRIPTION OF THE DRAWINGS

FIGS. 2A, 2B, and 2C are diagrams each showing an image circle of a fisheye lens system corresponding to a plurality of film formats, in which FIG. 2B is to an APS film format SLR camera, and FIG. 2C is to a digital SLR camera.

DETAILED DESCRIPTION OF THE PREFERRED EMBODIMENTS

Embodiments according to the present invention are going to be explained below with reference to accompanying drawings.

Figure 1A:
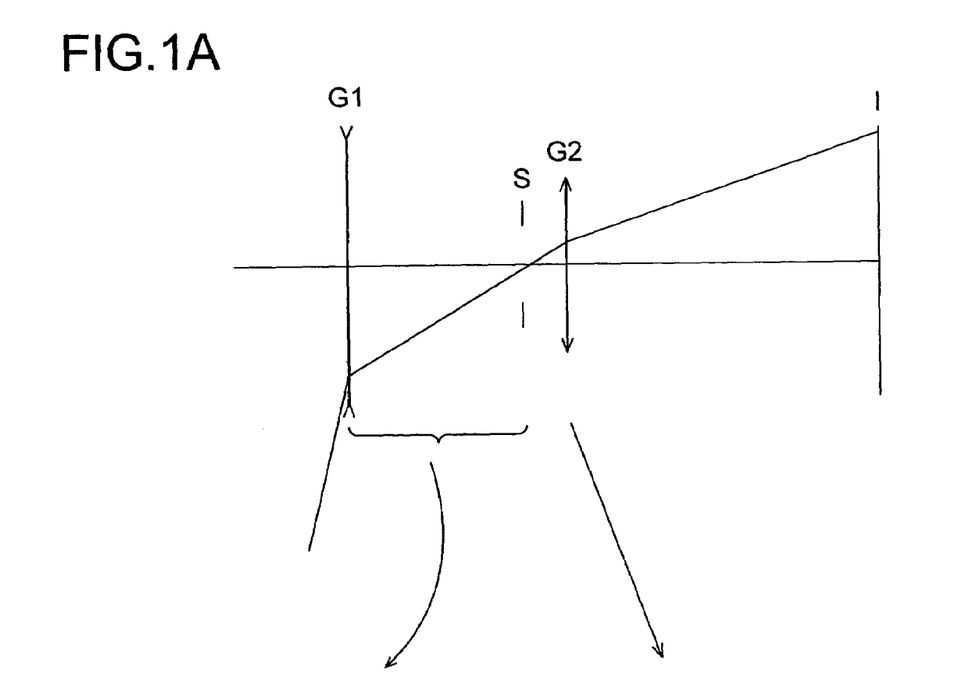
FIG. 1A is a diagram showing the principle of a fisheye lens system according to the present invention in the maximum focal length state.
Figure 1B:
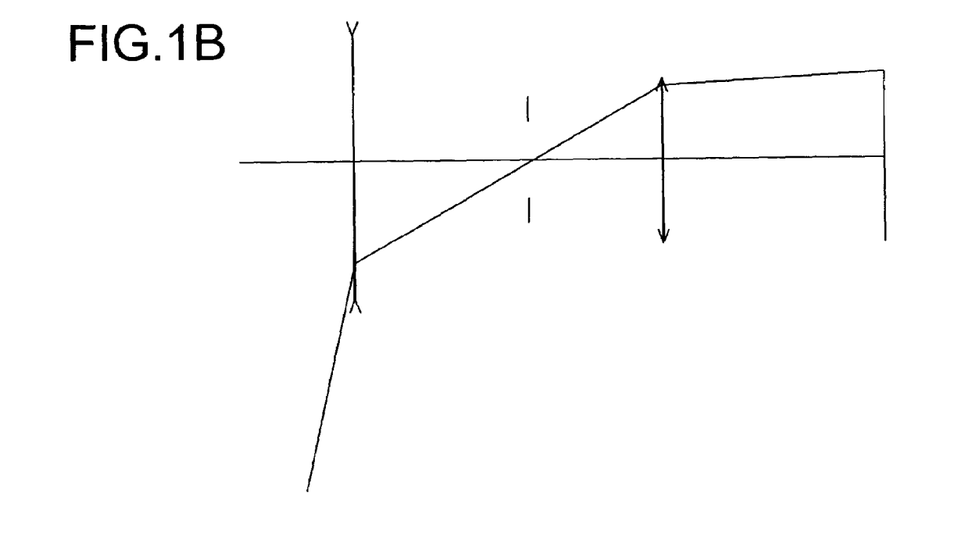
FIG. 1B is a diagram showing the principle of a fisheye lens system according to the present invention in the minimum focal length state.
Figure 2A:
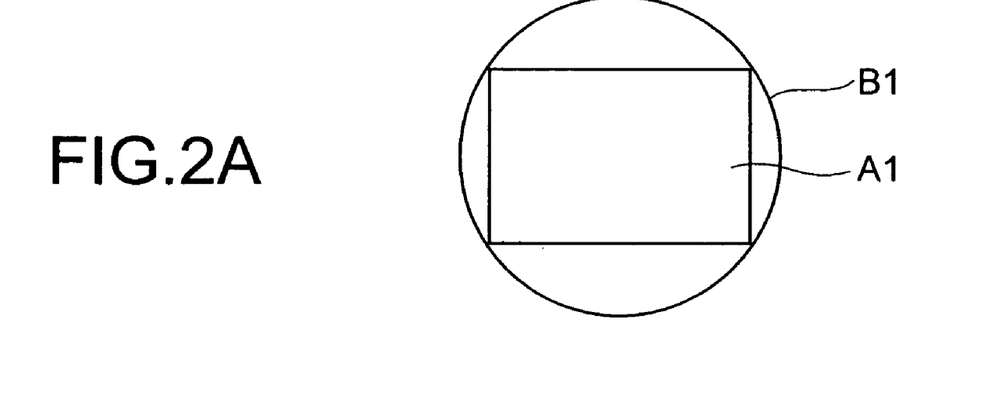
FIG. 2A shows an image circle corresponding to a 35 mm film format SLR camera.
Figure 2B:
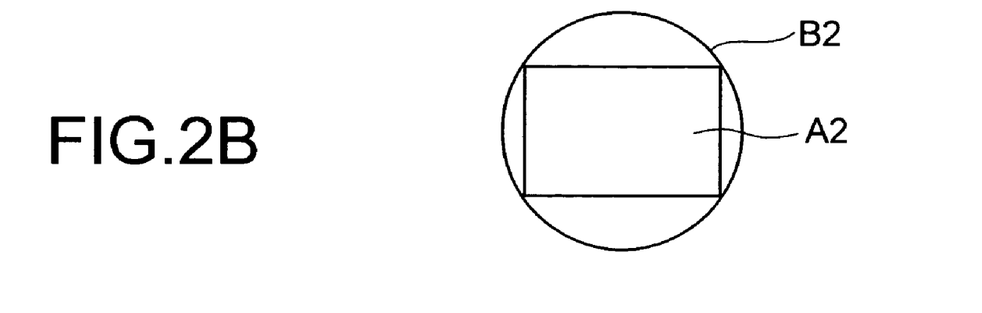
Figure 2C:
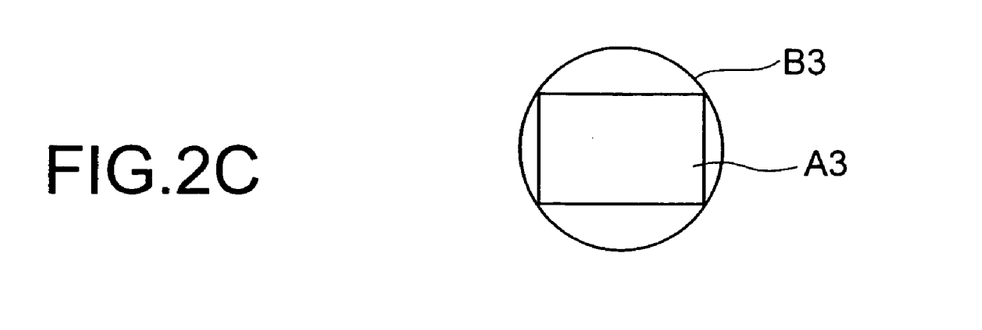

FIG. 1A is a diagram showing the principle of a fisheye lens system according to the present invention in the maximum focal length state and FIG. 1B is a diagram showing that in the minimum focal length state. FIGS. 2A, 2B, and 2C are diagrams each showing an image circle of a fisheye lens system corresponding to a plurality of film formats, in which FIG. 2A shows an image circle corresponding to a 35 mm film format SLR camera, FIG. 2B is to an APS film format SLR camera, and FIG. 2C is to a digital SLR camera.

As shown in FIGS. 1A and 1B, a fisheye lens system according to the present invention includes a first lens group G1 having negative refractive power disposed to the most object side, and a second lens group G2 having positive refractive power disposed to the image side of the first lens group G1. The distance between the first lens group G1 and the second lens group G2 can be varied. When the distance is minimum, the focal length becomes maximum (FIG. 1A), and when the distance is maximum, the focal length becomes minimum (FIG. 1B). The maximum image height in the maximum focal length state (FIG. 1A) is different from that in the minimum focal length state (FIG. 1B). In any focal length state, the angle of view is 170 degrees or more.

In FIGS. 1A and 1B, the fisheye lens system can vary the focal length from the maximum focal length state (FIG. 1A) to the minimum focal length state (FIG. 1B) by increasing a distance between the first lens group G1 and the second lens group G2. By keeping a distance between an aperture stop S and the first lens group G1, the height of the principal ray of the maximum angle of view passing through the first lens group G1 can be kept substantially constant from the maximum focal length state (FIG. 1A) to the minimum focal length state (FIG. 1B), so that increase in diameter of the first lens group G1 and waning of the light ray can be prevented.

As shown in FIG. 2, FIG. 2A shows an image circle B1 of a fisheye lens system corresponding to a 35 mm film format SLR camera (image size: 36×24 mm, diagonal length: 43.2 mm), FIG. 2B shows an image circle B2 of a fisheye lens system corresponding to an APS film format SLR camera (image size: 30.2×16.7 mm, diagonal length: 34.4 mm), and FIG. 2C shows an image circle B3 of a fisheye lens system corresponding to a digital SLR camera (image size: 23.7×15.6 mm, diagonal length: 28.4 mm). In each case, the angle of view is 170 degrees or more.

In other words, the fisheye lens system has the image circle of B1 corresponding to the image size A1 of the 35 mm film format SLR camera in the maximum focal length state (FIG. 2A), and the image circle of B3 corresponding to the image size A3 of the digital SLR camera in the minimum focal length state (FIG. 2C). In each state, the fisheye lens system secures the angle of view of 170 degree or more, so that a fisheye lens system capable of corresponding to a plurality of image sizes can be realized.

When the position of the first lens group G1 is the same in the maximum focal length state (FIG. 1A) and in the minimum focal length state (FIG. 1B), by constructing the first lens group G1 being fixed and the second lens group G2 being changeable two positions between the most object side position and the most image side position, a fisheye lens system capable of using with two kinds of image size such as a 35 mm film format SLR camera and a digital SLR camera can be realized. In this case, there is a merit that construction of moving lens group can be simplified.

Moreover, by moving both the first lens group G1 and the second lens group G2, any focal length state between the maximum focal length state and the minimum focal length state can be realized. In this case, a fisheye lens system capable of corresponding to more than three kinds of image size can be realized, for example, three kinds of film size such as a 35 mm film format SLR camera, an APS film format SLR camera, and a digital SLR camera.

Several kinds of focusing can be thought such as a method for moving the whole of a fisheye lens system, and a method for moving the first lens group G1. When focusing is carried out by moving the whole fisheye lens system, it has a demerit that a moving amount of focusing at a given position is different in the maximum focal length state from in the minimum focal length state. On the other hand, when focusing is carried out by moving the first lens group G1, it is preferable that a moving amount of focusing at a given position becomes substantially the same in the maximum focal length state and in the minimum focal length state.

Moreover, when focusing is carried out by moving the first lens group G1, the following two methods can be thought; the first one is that only the first lens group G1 is moved while the aperture stop S is fixed; and the second one is that the first lens group G1 and the aperture stop are moved in a body. When the first method is used, the distance between the first lens group G1 and the aperture stop S becomes wide upon focusing at close object, so that it tends to produce vignetting on the periphery of the image. When the second method is used, it hardly produces vignetting and an increase in the effective diameter of the first lens group can be prevented, so that it is desirable.

In a fisheye lens system according to the present invention, the following conditional expressions (1) through (3) are preferably satisfied:

$$1.2 < M2L/M2S \quad (1)$$

$$0.97 < M2L \cdot M2S < 1.03 \quad (2)$$

$$fS < |f1| < fL \quad (3)$$

where M2L denotes the magnification of the second lens group in the maximum focal length state, M2S denotes the magnification of the second lens group in the minimum focal length state, fL denotes the focal length of the fisheye lens system in the maximum focal length state, fS denotes the focal length of the fisheye lens system in the minimum focal length state, and f1 (f1<0) denotes the focal length of the first lens group G1.

Conditional expression (1) defines an appropriate range of the magnification of the second lens group G2. When the ratio M2L/M2S is equal to or falls below the lower limit of conditional expression (1), variation in the focal length becomes small causing fewer choice of image size that can obtain the angle of view of 170 degrees or more without producing vignetting on the periphery of the image, so that the problem to be solved by the present invention cannot be solved.

Conditional expression (2) defines an appropriate range of the magnification of the second lens group G2. When the value M2L·M2S comes out of the scope of conditional expression (2), the image plane moves upon changing the state of the focal length from the maximum focal length state to the minimum focal length state, so that it is undesirable. When the value M2L·M2S is equal to 1, the optimum result of the present invention can be obtained.

Conditional expression (3) defines an appropriate range of the focal length of the first lens group G1. When the value |f1| comes out of the scope of conditional expression (3), conditional expression (2) cannot be satisfied, so that it is undesirable.

EXAMPLE 1

Example 1 according to the present invention is going to be explained.

Figure 3A:
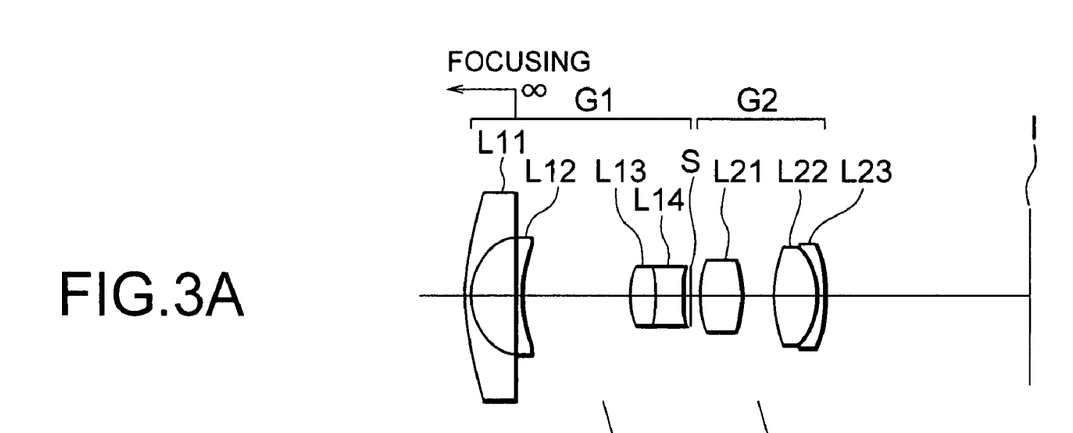
FIGS. 3A, 3B, and 3C are sectional views showing a fisheye lens system according to Example 1 of the present invention in the maximum focal length state, in an intermediate focal length state, and in the minimum focal length state, respectively.
Figure 3B:
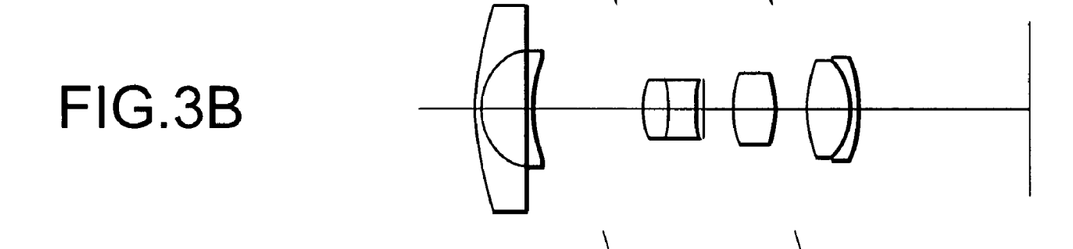
Figure 3C:
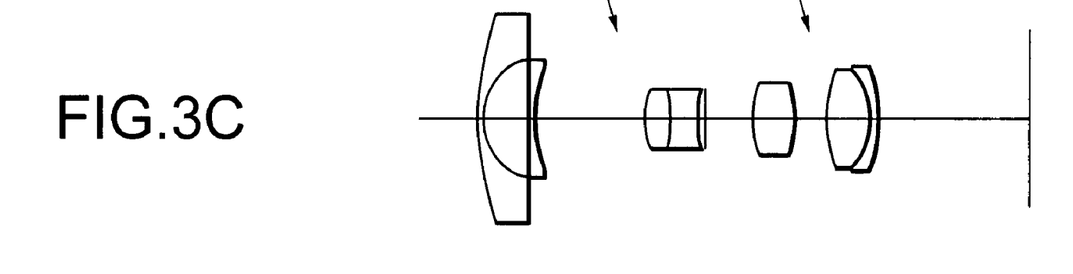

FIGS. 3A, 3B, and 3C are sectional views showing a fisheye lens system according to Example 1 of the present invention in the maximum focal length state, in an intermediate focal length state, and in the minimum focal length state, respectively.

In FIGS. 3A, 3B, and 3C, a fisheye lens system according to Example 1 of the present invention can vary its focal length continuously from the maximum focal length state (FIG. 3A) to the minimum focal length state (FIG. 3C). The maximum image height in the maximum focal length state (FIG. 3A) is 21.6 mm, which corresponds to the image size of a 35 mm film format SLR camera. When the lens is equipped on a 35 mm film format SLR camera, the lens becomes a fisheye lens with an angle of view of 178 degrees. The maximum image height in an intermediate focal length state (FIG. 3B) is 17.2 mm, which corresponds to the image size of an APS film format SLR camera. When the lens is equipped on an APS film format SLR camera, the lens becomes a fisheye lens with an angle of view of 178 degrees. The maximum image height in the minimum focal length state (FIG. 3C) is 14.2 mm, which corresponds to the image size of a digital SLR camera. When the lens is equipped on a digital SLR camera, the lens becomes a fisheye lens with an angle of view of 178 degrees.

The fisheye lens system according to Example 1 is composed of, in order from an object, a first lens group G1 having negative refractive power, an aperture stop S, and a second lens group G2 having positive refractive power. When the focal length state continuously changes from the maximum focal length state (FIG. 3A) to the minimum focal length state (FIG. 3C), a distance between the first lens group G1 and the second lens group G2 increases. On that occasion, the first lens group G1 and the aperture stop S move in a body, and the second lens group G2 moves to the image I side.

The first lens group G1 is composed of, in order from the object, a negative meniscus lens L11 having a convex surface facing to the object, a negative meniscus lens L12 having a convex surface facing to the object, and a cemented negative lens constructed by a double convex positive lens L13 and a double concave negative lens L14.

The second lens group G2 is composed of, in order from the object, a double convex positive lens L21 having an aspherical surface formed on the image side surface, and a cemented positive lens constructed by a double convex positive lens L22 and a negative meniscus lens L23 having a concave surface facing to the object.

By moving the first lens group G1 and the aperture stop S in a body to the object side, focusing from a far object to a close object is carried out.

Various values associated with Example 1 are listed in Table 1. In the [Specifications], f denotes the focal length, FNO denotes the f-number, 2A denotes the maximum value of an angle of view (unit: degree), and Y denotes the maximum image height. In [Lens Data], the first column is a surface number counted in order from the object side, the second column "r" is a radius of curvature of a lens surface, the third column "d" is a distance between adjacent lens surfaces, the fourth column "ν" is Abbe number, and the fifth column "n" is refractive index at d-line (λ=587.6 nm). In [Aspherical Surface Data], aspherical coefficients expressed by the following expression are shown:

$$X(y)=y^2/[r[1+(1-\kappa \cdot y^2/r^2)^{1/2}]]+C4 \cdot y^4+C6 \cdot y^6+C8 \cdot y^8+C10 \cdot y^{10}$$

where X(y) denotes the distance along the optical axis from the tangent plane on the vertex of the aspherical surface to the position of the aspherical surface at the height of y, r denotes a paraxial radius of curvature, κ denotes the conical coefficient, and Ci denotes i-th order aspherical surface coefficient. The reference symbol "E-n" in the aspherical data denotes "$10^{-n}$" (where n is an integer.)

In [Variable Distance Data], the focal length f, variable distance values d8, back focal length Bf, and the total lens length TL in the maximum focal length state, in the intermediate focal length state, and in the minimum focal length state are listed. And also the magnification β, variable distance values d8, back focal length Bf, and the total lens length TL in the maximum focal length state, in the intermediate focal length state, and in the minimum focal length state upon focusing at close object are listed. R denotes a distance between the object and the image plane I. In [Values for Conditional Expressions], value of the parameter in each conditional expression is shown. Values in the following each Example are denoted by the same reference symbols as Example 1.

In the tables for various values, "mm" is generally used for the unit of length such as the focal length, a radius of curvature, a distance between the adjacent surfaces. However, since an optical system proportionally enlarged or reduced its dimension can be obtained similar optical performance, the unit is not necessary to be limited to "mm" and any other suitable unit can be used.

TABLE 1

[Specifications]
Focal Length

| State | Maximum | Intermediate | Minimum |
|---|---|---|---|
| f | 16.212 | 13.121 | 10.962 |
| FNO | 3.57 | 3.54 | 3.55 |
| 2A | 178° | 178° | 178° |
| Y | 21.6 | 17.2 | 14.2 |

[Lens Data]

| | r | d | ν | n |
|---|---|---|---|---|
| 1 | 71.0000 | 1.5000 | 46.58 | 1.804000 |
| 2 | 15.7944 | 11.7234 | | |
| 3 | 868.2237 | 1.5000 | 46.58 | 1.804000 |
| 4 | 42.0729 | 26.9915 | | |
| 5 | 22.9118 | 6.0000 | 35.30 | 1.592700 |
| 6 | −33.3466 | 6.7773 | 49.61 | 1.772500 |
| 7 | 28.7036 | 2.0288 | | |
| 8 | 0.0000 | (d8) | | Aperture Stop S |
| 9 | 26.0111 | 9.9565 | 81.61 | 1.497000 |
| 10 | −60.0591 | 8.5864 | | Aspherical Surface |
| 11 | 44.5158 | 11.0000 | 81.61 | 1.497000 |
| 12 | −17.6786 | 1.5000 | 23.78 | 1.846660 |
| 13 | −37.3462 | (Bf) | | |

[Aspherical Surface Data]
Surface Number = 10

κ = 1.0000
C4 = 1.12590E−5
C6 = 7.18210E−17
C8 = 9.50220E−22
C10 = 1.10880E−26

[Variable Distance Data]

| Focal Length State | Maximum | Intermediate | Minimum |
|---|---|---|---|
| (focusing at infinity) | | | |
| f | 16.212 | 13.121 | 10.962 |
| d8 | 2.000 | 7.011 | 12.188 |
| Bf | 51.189 | 43.543 | 38.200 |
| TL | 140.752 | 138.117 | 137.952 |
| (focusing at close object R = 500) | | | |
| β | −0.04286 | −0.03444 | −0.02876 |
| d8 | 2.368 | 7.376 | 12.554 |
| Bf | 51.189 | 43.543 | 38.200 |
| TL | 141.121 | 138.483 | 138.318 |

[Values for Conditional Expressions]

M2L = −1.37312
M2S = −0.92842
(1) M2L/M2S = 1.479

Figure 4:
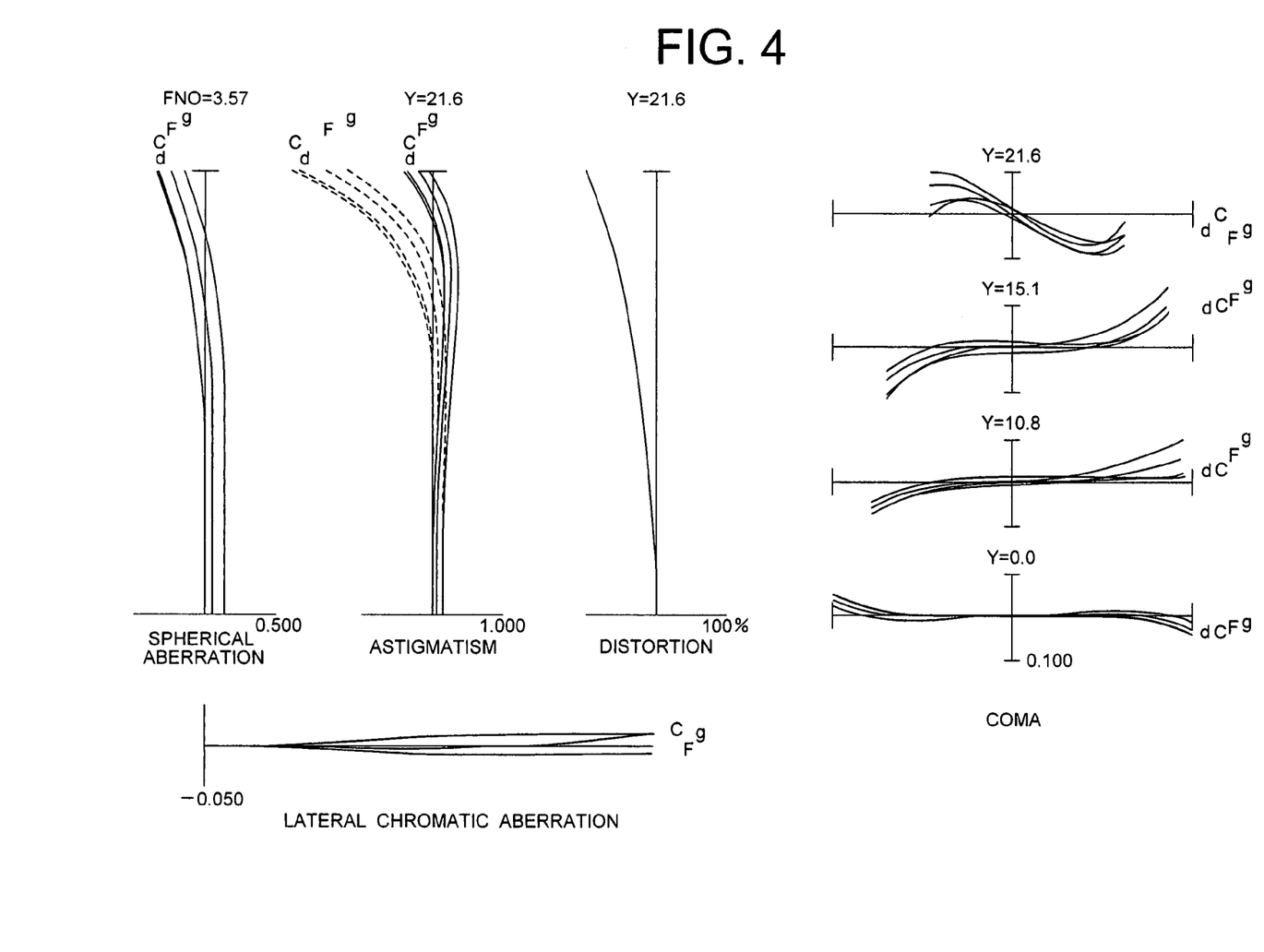
FIG. 4 shows various graphs regarding various aberrations of the fisheye lens system according to Example 1 in the maximum focal length state when the system is focusing at infinity.
Figure 5:
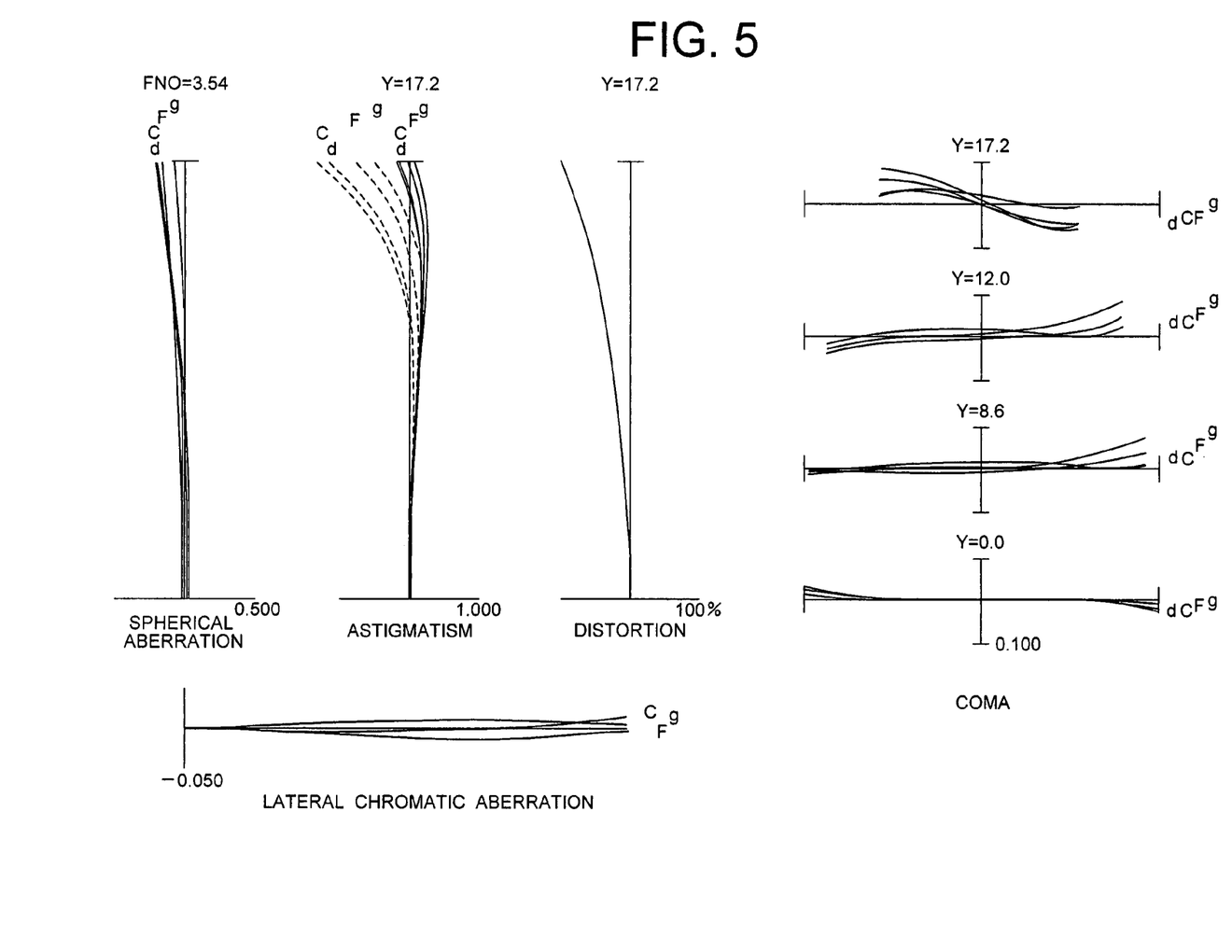
FIG. 5 shows various graphs regarding various aberrations of the fisheye lens system according to Example 1 in an intermediate focal length state when the system is focusing at infinity.
Figure 6:
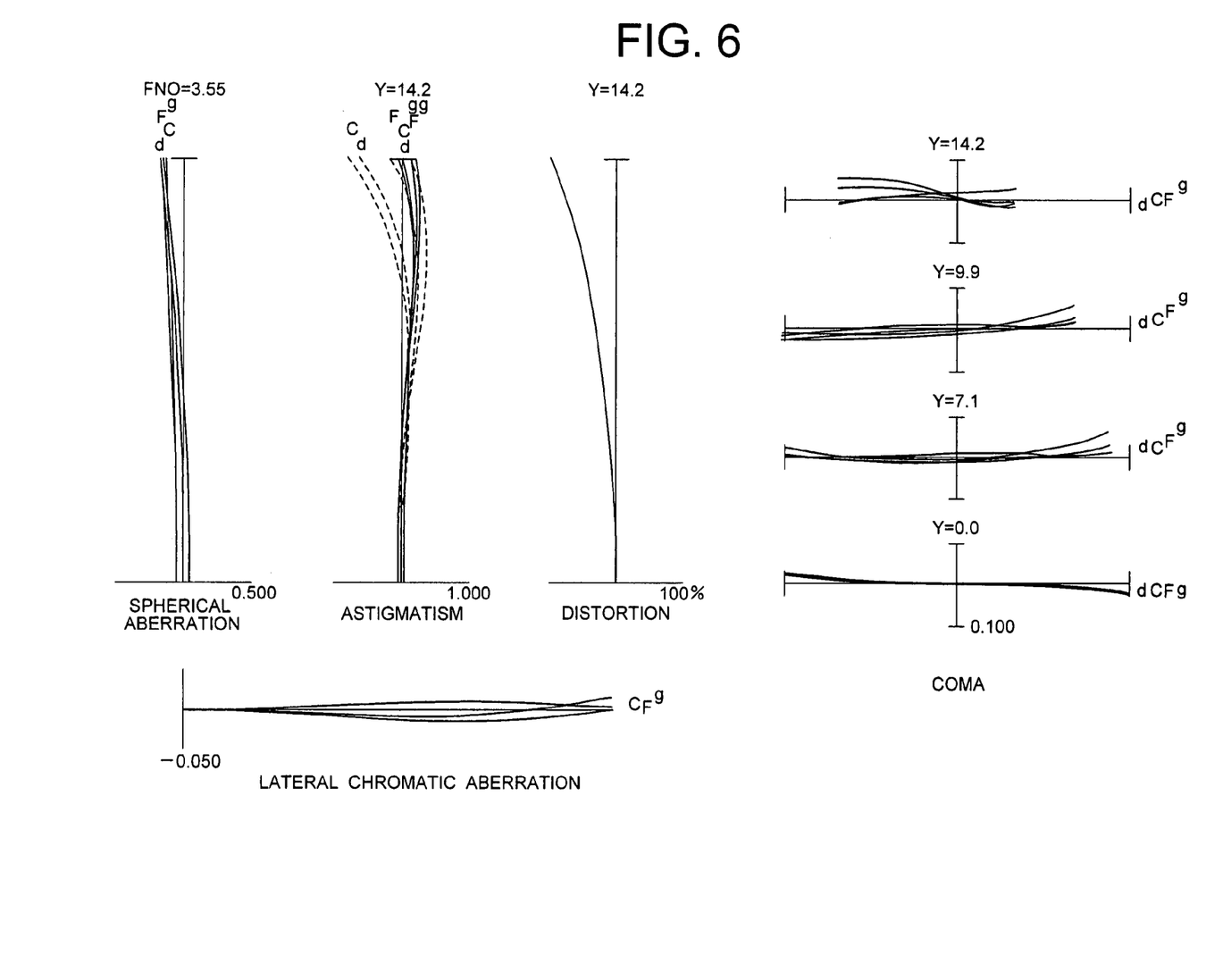
FIG. 6 shows various graphs regarding various aberrations of the fisheye lens system according to Example 1 in the minimum focal length state when the system is focusing at infinity.
Figure 7:
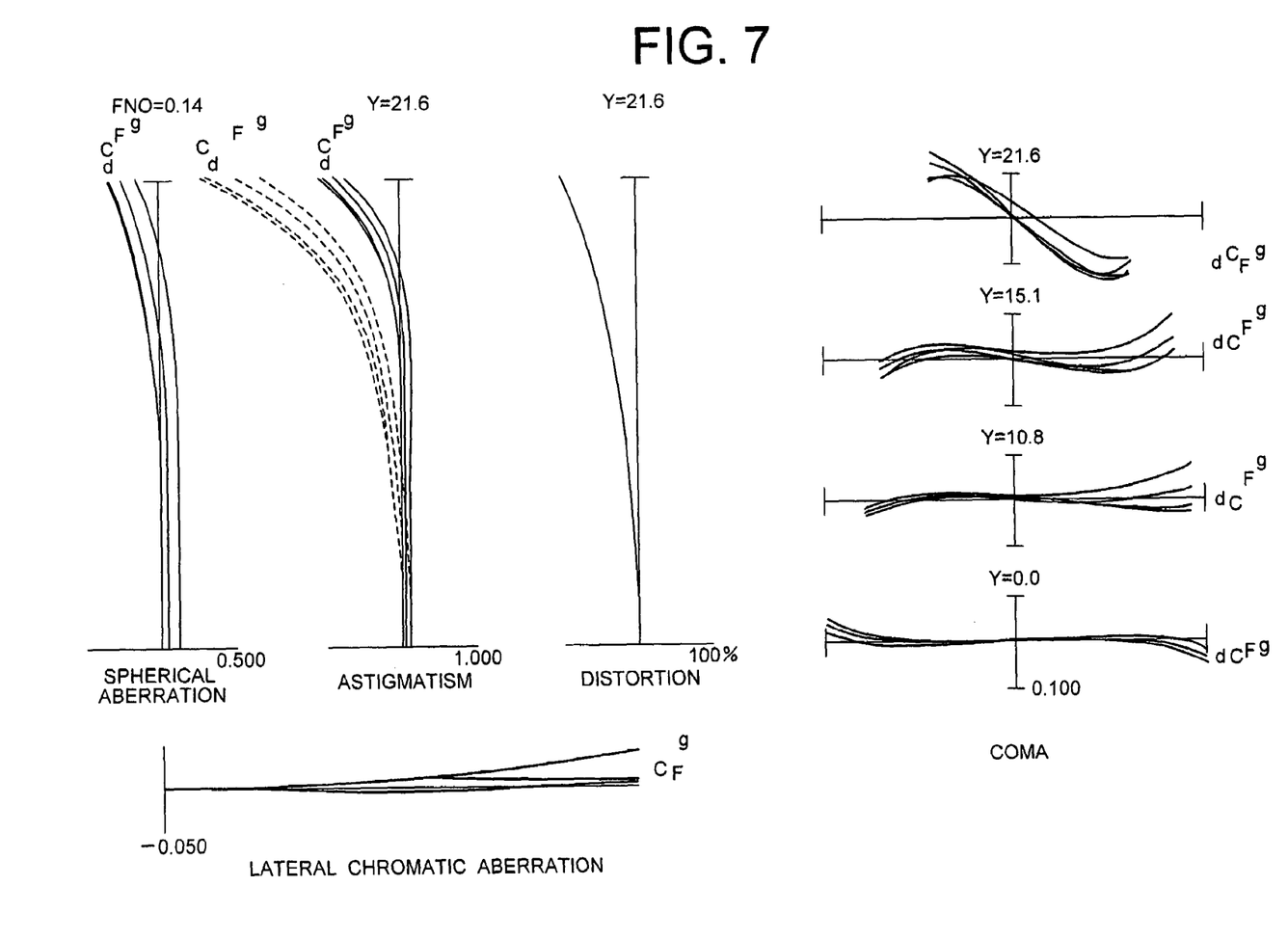
FIG. 7 shows various graphs regarding various aberrations of the fisheye lens system according to Example 1 in the maximum focal length state when the system is focusing at close object.
Figure 8:
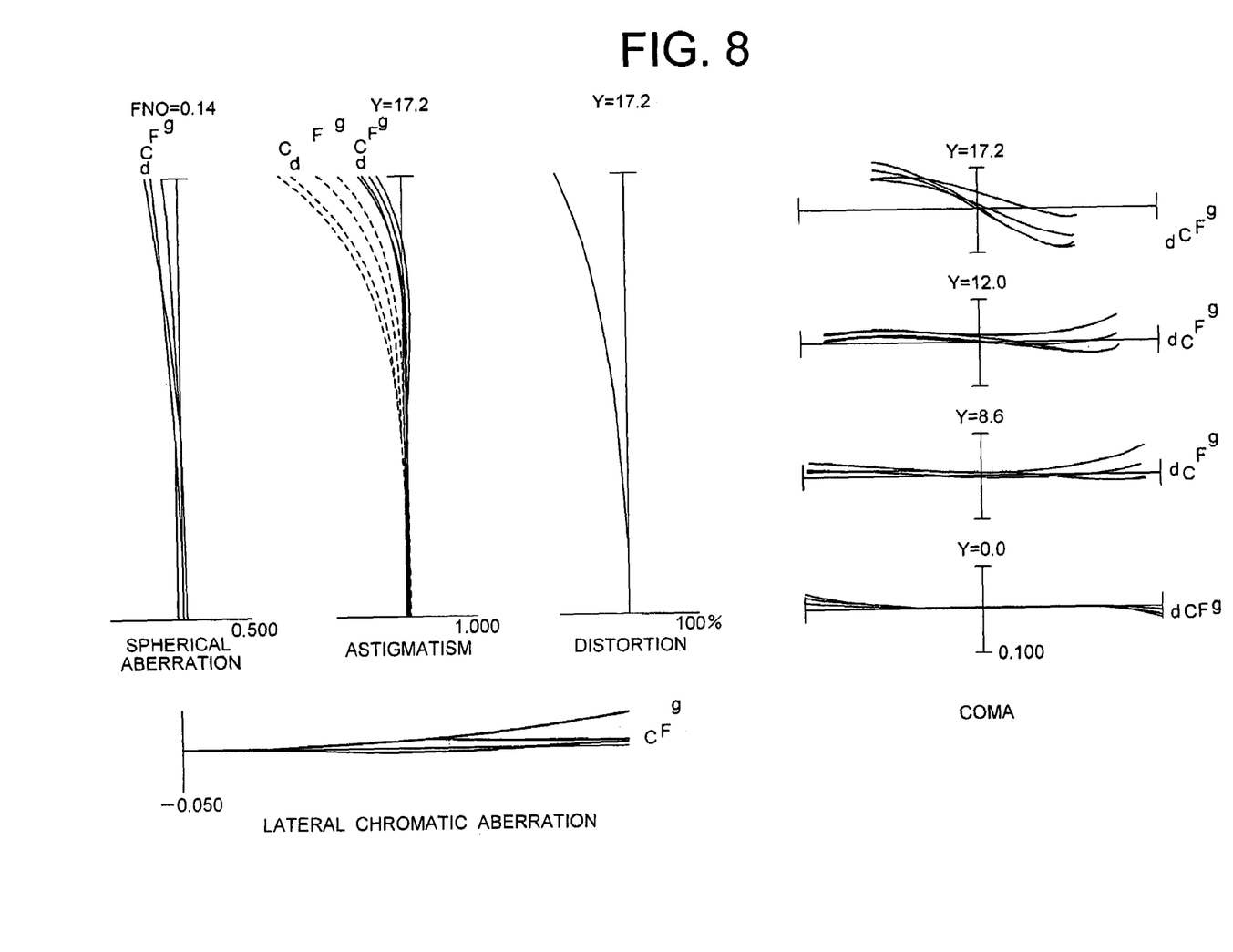
FIG. 8 shows various graphs regarding various aberrations of the fisheye lens system according to Example 1 in an intermediate focal length state when the system is focusing at close object.
Figure 9:
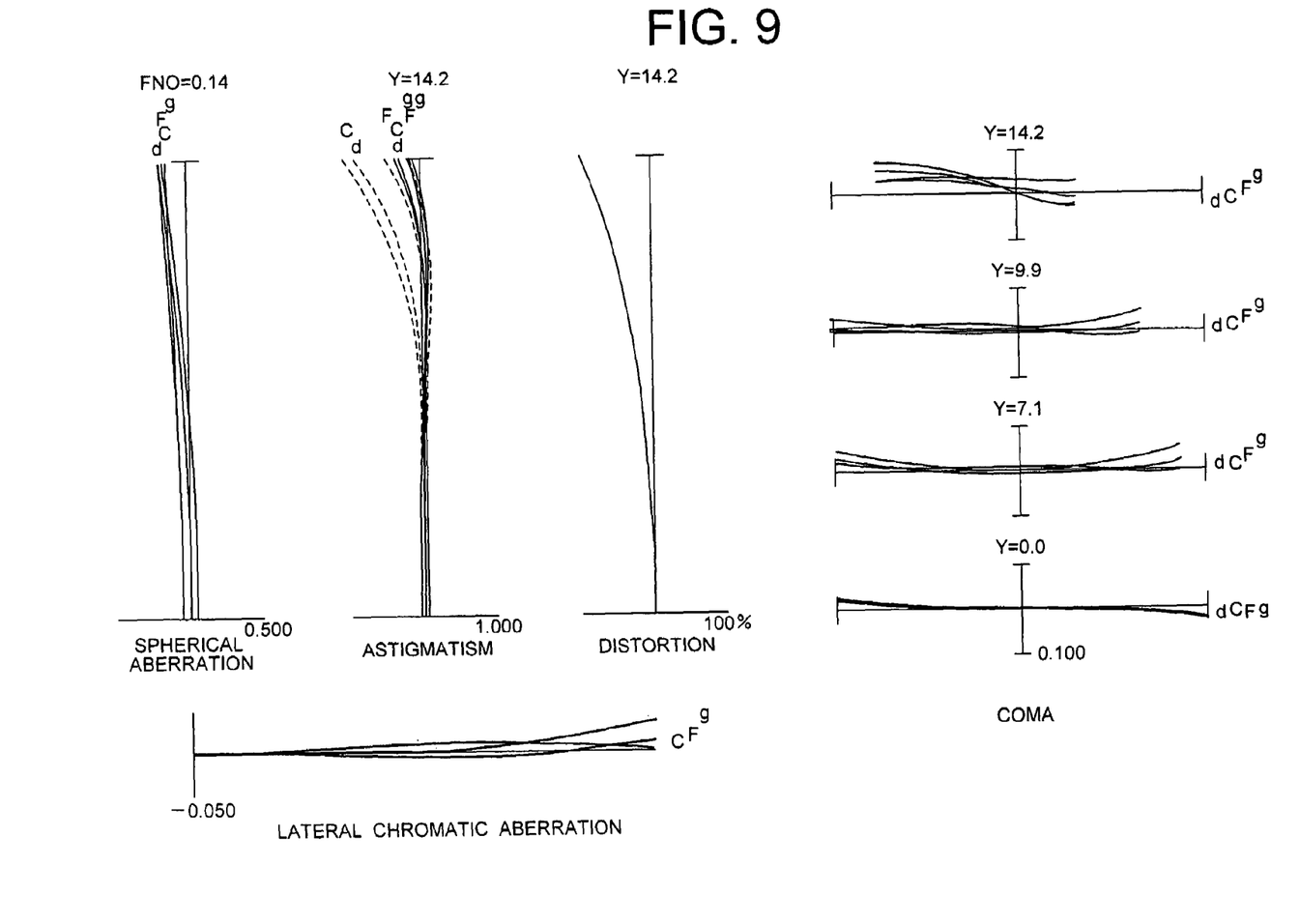
FIG. 9 shows various graphs regarding various aberrations of the fisheye lens system according to Example 1 in the minimum focal length state when the system is focusing at close object.

FIG. 4 shows various graphs regarding various aberrations of the fisheye lens system according to Example 1 in the maximum focal length state when the system is focusing at infinity. FIG. 5 shows various graphs regarding various aberrations of the fisheye lens system according to Example 1 in an intermediate focal length state when the system is focusing at infinity. FIG. 6 shows various graphs regarding various aberrations of the fisheye lens system according to Example 1 in the minimum focal length state when the system is focusing at infinity. FIG. 7 shows various graphs regarding various aberrations of the fisheye lens system according to Example 1 in the maximum focal length state when the system is focusing at close object. FIG. 8 shows various graphs regarding various aberrations of the fisheye lens system according to Example 1 in an intermediate focal length state when the system is focusing at close object. FIG. 9 shows various graphs regarding various aberrations of the fisheye lens system according to Example 1 in the minimum focal length state when the system is focusing at close object.

In graphs for various aberrations, FNO denotes the f-number, NA denotes the numerical aperture, Y denotes an image height. Reference symbol d denotes d-line (λ=587.6 nm), g denotes g-line (λ=435.6 nm), C denotes C-line (λ=656.3 nm), and F denotes F-line (λ=486.1 nm). In the diagrams showing spherical aberration, FNO denotes f-number with respect to the maximum aperture or NA denotes the maximum numerical aperture value. In the diagrams showing astigmatism and distortion, Y denotes the maximum image height. In the diagrams showing coma, Y denotes an image height for each image. In the diagrams showing astigmatism, a solid line indicates a sagittal image plane and a broken line indicates a meridional image plane.

In graphs for various aberrations in the following Examples, the same reference symbols as this Example are used.

As is apparent from the respective graphs, the fisheye lens system according to Example 1 shows superb optical performance as a result of good corrections to various aberrations.

EXAMPLE 2

Example 2 according to the present invention is going to be explained below.

Figure 10A:
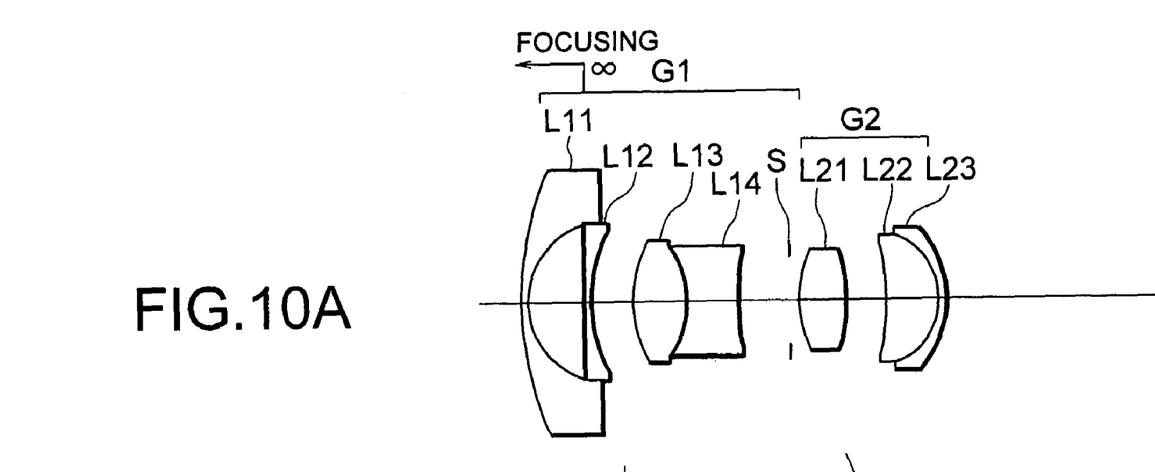
FIGS. 10A and 10B are sectional views showing a fisheye lens system according to Example 2 of the present invention in the maximum focal length state, and in the minimum focal length state, respectively.
Figure 10B:
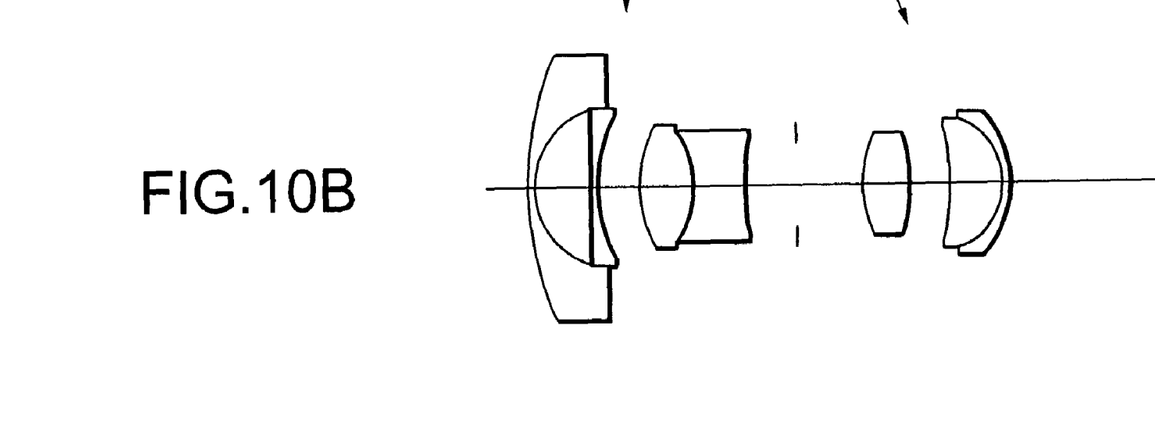

FIGS. 10A and 10B are sectional views showing a fisheye lens system according to Example 2 of the present invention in the maximum focal length state, and in the minimum focal length state, respectively.

A fisheye lens system according to Example 2 of the present invention can change over its focal length from the maximum focal length state (FIG. 10A) to the minimum focal length state (FIG. 10B). The maximum image height in the maximum focal length state (FIG. 10A) is 21.6 mm, which corresponds to the image size of a 35 mm film format SLR camera. When the lens is equipped on a 35 mm film format SLR camera, the lens becomes a fisheye lens with an angle of view of 178 degrees. The maximum image height in the minimum focal length state (FIG. 10B) is 14.2 mm, which corresponds to the image size of a digital SLR camera. When the lens is equipped on a digital SLR camera, the lens becomes a fisheye lens with an angle of view of 178 degrees.

The fisheye lens system according to Example 2 of the present invention is composed of, in order from an object, a first lens group G1 having negative refractive power, an aperture stop S, and a second lens group G2 having positive refractive power. When the focal length state changes over from the maximum focal length state (FIG. 10A) to the minimum focal length state (FIG. 10B), a distance between the first lens group G1 and the second lens group G2 increases. On that occasion, the first lens group G1 and the aperture stop S is fixed, and the second lens group G2 moves to the image I side.

The first lens group G1 is composed of, in order from the object, a negative meniscus lens L11 having a convex surface facing to the object, a double concave negative lens L12, and a cemented positive lens constructed by a double convex positive lens L13 and a double concave negative lens L14.

The second lens group G2 is composed of, in order from the object, a double convex positive lens L21 having an aspherical surface formed on the image side surface, and a cemented positive lens constructed by a positive meniscus lens L22 having a concave surface facing to the object and a negative meniscus lens L23 having a concave surface facing to the object.

By moving the first lens group G1 and the aperture stop S in a body to the object side, focusing from a far object to a close object is carried out.

Various values associated with Example 2 are listed in Table 2.

TABLE 2

[Specifications]
Focal Length

| State | Maximum | Minimum |
|---|---|---|
| f | 15.995 | 10.894 |
| FNO | 3.57 | 3.58 |
| 2A | 178° | 178° |
| Y | 21.6 | 14.2 |

[Lens Data]

|  | r | d | ν | n |
|---|---|---|---|---|
| 1 | 68.0000 | 1.5000 | 46.58 | 1.804000 |
| 2 | 16.5574 | 11.5166 |  |  |
| 3 | −2260.8901 | 1.5000 | 46.58 | 1.804000 |
| 4 | 30.2068 | 9.0698 |  |  |
| 5 | 25.3773 | 11.0000 | 35.30 | 1.592700 |
| 6 | −19.4665 | 11.0000 | 49.32 | 1.743200 |
| 7 | 58.8171 | 11.0513 |  |  |
| 8 | 0.0000 | (d8) |  | Aperture Stop S |
| 9 | 26.6193 | 9.4624 | 81.61 | 1.497000 |
| 10 | −31.9272 | 8.5344 |  | Aspherical Surface |
| 11 | −52.2854 | 11.0000 | 81.61 | 1.497000 |
| 12 | −14.2167 | 1.5000 | 23.78 | 1.846660 |
| 13 | −21.7709 | (Bf) |  |  |

[Aspherical Surface Data]
Surface Number = 10

κ = 1.0000
C4 = 2.21170E−5
C6 = −1.50610E−15
C8 = −1.84000E−20
C10 = −2.32910E−25

[Variable Distance Data]

| Focal Length State | Maximum | Minimum |
|---|---|---|
| (focusing at infinity) | | |
| f | 15.995 | 10.894 |
| d8 | 2.000 | 14.083 |
| Bf | 50.282 | 38.199 |
| TL | 139.416 | 139.416 |
| (focusing at close object R = 500) | | |
| β | −0.04206 | −0.02865 |
| d8 | 2.458 | 14.541 |
| Bf | 50.282 | 38.199 |
| TL | 139.874 | 139.874 |

[Values for Conditional Expressions]

M2L = −1.21167
M2S = −0.82530
(1) M2L/M2S = 1.468
(2) M2L · M2S = 1.000
fL = 15.995
fS = 10.894
f1 = −13.200

Figure 11A:
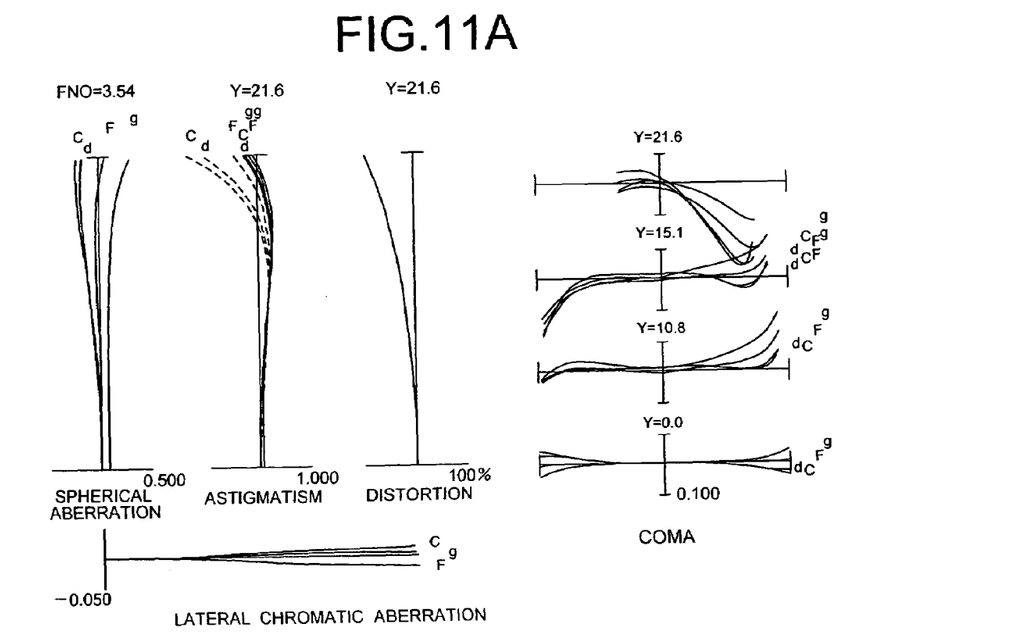
FIG. 11A shows various graphs regarding various aberrations of the fisheye lens system according to Example 2 in the maximum focal length state when the system is focusing at infinity.
Figure 11B:
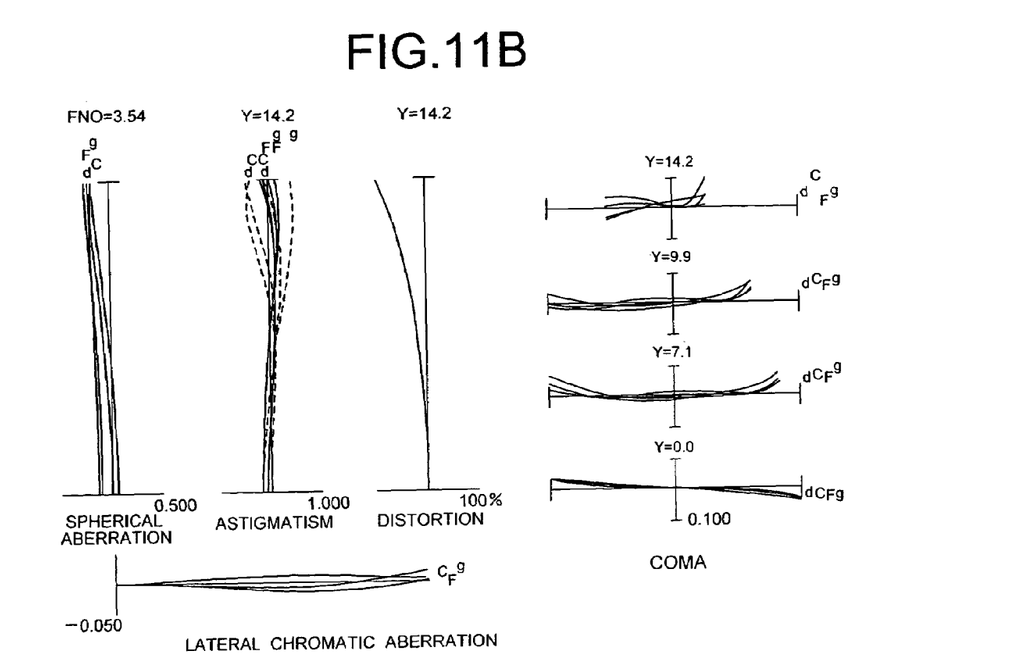
FIG. 11B shows various graphs regarding various aberrations of the fisheye lens system according to Example 2 in the minimum focal length state when the system is focusing at infinity.
Figure 12A:
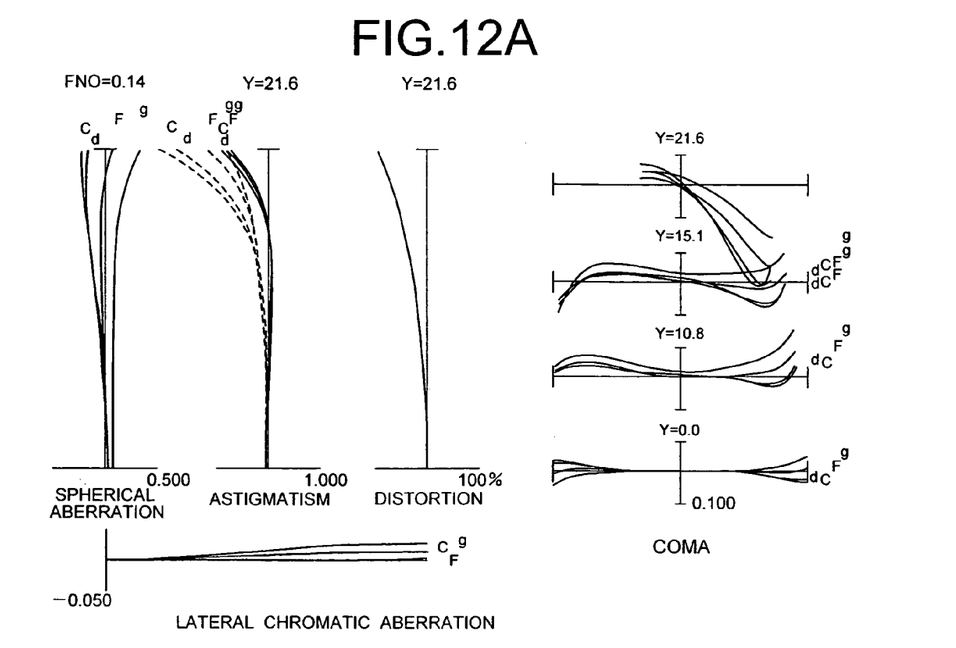
FIG. 12A shows various graphs regarding various aberrations of the fisheye lens system according to Example 2 in the maximum focal length state when the system is focusing at close object.
Figure 12B:
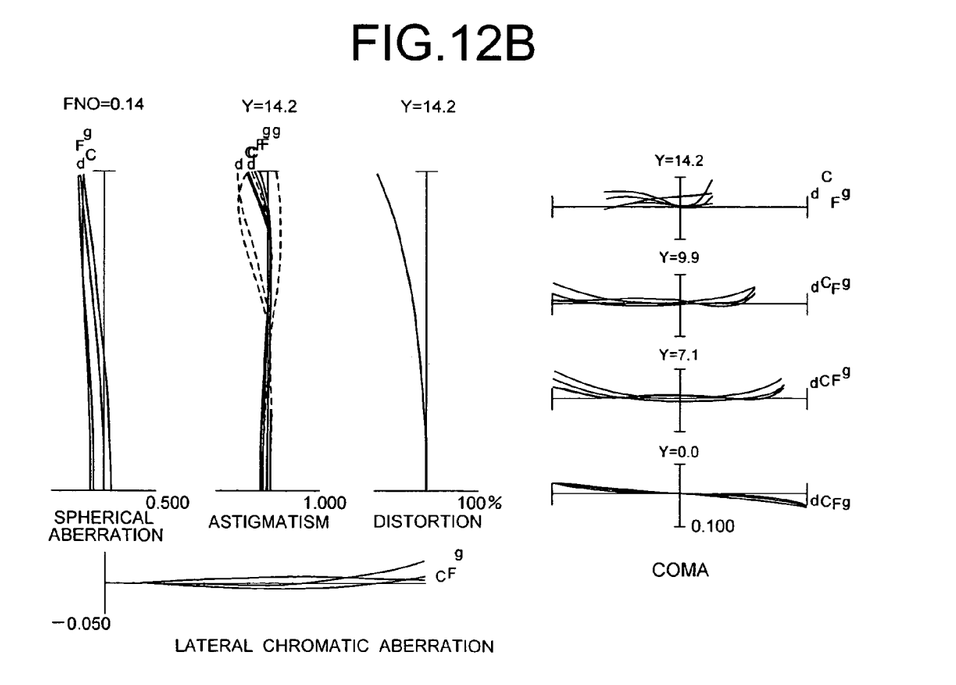
FIG. 12B shows various graphs regarding various aberrations of the fisheye lens system according to Example 2 in the minimum focal length state when the system is focusing at close object.

FIG. 11A shows various graphs regarding various aberrations of the fisheye lens system according to Example 2 in the maximum focal length state when the system is focusing at infinity. FIG. 11B shows various graphs regarding various aberrations of the fisheye lens system according to Example 2 in the minimum focal length state when the system is focusing at infinity. FIG. 12A shows various graphs regarding various aberrations of the fisheye lens system according to Example 2 in the maximum focal length state when the system is focusing at close object. FIG. 12B shows various graphs regarding various aberrations of the fisheye lens system according to Example 2 in the minimum focal length state when the system is focusing at close object.

As is apparent from the respective graphs, the fisheye lens system according to Example 2 shows superb optical performance as a result of good corrections to various aberrations.

As described above, the present invention makes it possible to provide a fisheye lens system capable of realizing the angle of view of 170 degrees or more with a plurality of cameras having different image size with each other.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A fisheye lens system comprising:
a first lens group having negative refractive power disposed most to an object side;
a second lens group having positive refractive power disposed to an image side of the first lens group;
a distance between the first lens group and the second lens group being variable;
wherein the fisheye lens system takes a maximum focal length state when the distance is minimum, and a minimum focal length state when the distance is maximum;
wherein a maximum image height in the maximum focal length state is different from that in the minimum focal length state; and
in each focal length state the fisheye lens system has an angle of view of 170 degrees or more.

2. The fisheye lens system according to claim 1, wherein the lens system can be used for a plurality of cameras whose image sizes are different from each other; and
wherein when the lens system is attached to a camera having a maximum image size in the maximum focal length state, the lens system has an angle of view of 170 degrees or more; and
when the lens system is attached to a camera having a minimum image size in the minimum focal length state, the lens system has an angle of view of 170 degrees or more.

3. The fisheye lens system according to claim 1, wherein the lens system can be used by changing over two states that are the maximum focal length state and the minimum focal length state; and
wherein upon changing over each state, the first lens group is not moved, and the second lens group is moved.

4. The fisheye lens system according to claim 1, wherein the lens system can be used in any focal length state between the maximum focal length state and the minimum focal length state; and
wherein upon changing the focal length state, both the first lens group and the second lens group are moved.

5. The fisheye lens system according to claim 1, wherein upon focusing from a far object to a close object, the first lens group is moved toward the object side.

6. The fisheye lens system according to claim 1, further including an aperture stop;
wherein a distance between the most object side lens surface and the aperture stop is the same in the maximum focal length state and the minimum focal length state.

7. The fisheye lens system according to claim 6, wherein upon focusing from a far object to a close object, the first lens group and the aperture stop are moved together toward the object side.

8. The fisheye lens system according to claim 1, wherein the lens system includes, in order from the object:
the first lens group;
an aperture stop; and
the second lens group;
wherein upon changing the focal length state from the maximum focal length state to the minimum focal length state, a distance between the first lens group and the aperture stop is fixed, a distance between the aperture stop and the second lens group increases, and a distance between the second lens group and an image plane decreases;
wherein upon focusing from a far object to a close object, the distance between the first lens group and the aperture stop is fixed, the distance between the aperture stop and the second lens group increases, and the distance between the second lens group and an image plane is fixed; and
wherein the following conditional expression is satisfied:

$$1.2 < M2L/M2S$$

where M2L denotes the magnification of the second lens group in the maximum focal length state, and M2S denotes the magnification of the second lens group in the minimum focal length state.

9. The fisheye lens system according to claim 3, wherein the lens system includes, in order from the object
the first lens group;
an aperture stop; and
the second lens group;
wherein upon changing the focal length state from the maximum focal length state to the minimum focal length state, a distance between the first lens group and the aperture stop is fixed, a distance between the aperture stop and the second lens group increases, and a distance between the second lens group and an image plane decreases; and
wherein the following conditional expressions are satisfied:

$$1.2 < M2L/M2S$$

$$0.97 < M2L \cdot M2S < 1.03$$

$$fS < |f1| < fL$$

where M2L denotes the magnification of the second lens group in the maximum focal length state, M2S denotes the magnification of the second lens group in the minimum focal length state, fL denotes the focal length of the fisheye lens system in the maximum focal length state, fS denotes the focal length of the fisheye lens system in the minimum focal length state, and f1 (f1<0) denotes the focal length of the first lens group.

10. The fisheye lens system according to claim 1, wherein the lens system includes, in order from the object:
the first lens group; and
the second lens group;
wherein upon changing the focal length state from the maximum focal length state to the minimum focal length state, a distance between the first lens group and the second lens group increases, and a distance between the second lens group and an image plane decreases; and wherein the first lens group includes a negative meniscus lens having a convex surface which faces the object, said convex surface being a lens surface disposed to the object side in the fisheye lens system; and the second lens group includes a positive lens having an aspherical surface.

* * * * *